United States Patent [19]

Place

[11] 4,133,478
[45] Jan. 9, 1979

[54] TEMPERATURE RESPONSIVE VALVE

[75] Inventor: Donald E. Place, Mansfield, Ohio

[73] Assignee: Therm-O-Disc Incorporated, Mansfield, Ohio

[21] Appl. No.: 766,147

[22] Filed: Feb. 7, 1977

[51] Int. Cl.² ............................................ G05D 23/10
[52] U.S. Cl. .................................... 236/48 R; 236/87; 236/101 C
[58] Field of Search .................... 236/48 R, 87, 101 C; 220/4 B; 137/533.19, 543.17, 529, 843

[56] References Cited

U.S. PATENT DOCUMENTS

| 2,706,065 | 4/1955 | Stone | 220/4 B X |
|---|---|---|---|
| 3,069,125 | 12/1962 | Hewitt, Jr. | 236/48 R X |
| 3,804,326 | 4/1974 | McIntire | 236/87 X |
| 3,965,222 | 6/1976 | Benjamin | 236/87 X |
| 4,025,042 | 5/1977 | Doherty, Jr. et al. | 236/101 C |
| 4,029,257 | 6/1977 | Jenkins et al. | 236/101 C |
| 4,048,611 | 9/1977 | Kuczynski et al. | 337/343 X |

FOREIGN PATENT DOCUMENTS 673045  3/1939  Fed. Rep. of Germany ...... 137/543.17

Primary Examiner—William E. Wayner
Assistant Examiner—William E. Tapolcai, Jr.
Attorney, Agent, or Firm—McNenny, Pearne, Gordon, Gail, Dickinson & Schiller

[57] ABSTRACT

A temperature responsive valve is disclosed including a pair of body members which are snapped together and when assembled define a valve chamber. Located within the valve chamber is a bimetal snap disc which seats at its periphery against an O-ring type valve seat when in one position of stability and is spaced from the valve seat in its other position of stability. A spider type spring extends between the cover member and the center of the disc to urge the disc in a direction toward the valve seat. The spring is provided with depending tabs which are positioned adjacent to the side wall of the cavity and function to insure proper location of the spring during assembly of the cover member. The tabs also function to insure proper position of the disc during the operation of the valve.

11 Claims, 4 Drawing Figures

TEMPERATURE RESPONSIVE VALVE

BACKGROUND OF THE INVENTION

This invention relates generally to temperature responsive valves and more particularly to a novel and improved valve utilizing a bimetal snap disc.

PRIOR ART

Valves employing bimetal snap discs as the valving element are known. One example of such a valve is disclosed in U.S. Pat. No. 3,687,290 to Meyers granted Aug. 29, 1972. Other prior art devices employ O-ring valve seats which are engaged by the snap disc to seal the valve. In some instances the O-rings are substantially adjacent to the center of the disc and in other instances the O-ring is engaged substantially adjacent to the periphery of the disc. Also such prior art valves sometimes employ a spring which engages the disc to press it toward the O-ring type valve seat.

SUMMARY OF THE INVENTION

In accordance with the present invention a novel and improved temperature responsive valve is provided utilizing a bimetal snap disc which seats against a valve seat in combination with a spider type spring which provides locating means for insuring proper location of the spring during assembly. In the illustrated embodiment the valve includes a body member and cover member which cooperate when assembled to define a valve chamber. Located in the valve chamber is an O-ring type valve seat and a bimetal snap disc which snaps back and forth in response to predetermined temperature conditions to open and close the valve. In the illustrated embodiment the O-ring is engaged by the snap disc substantially adjacent to the periphery of the disc.

A spider type spring is positioned between the snap disc and the cover member and operates to urge the center of the valve disc toward a positioning surface or projection on the body member. The spring is of the spider type having three laterally projecting legs which are inclined and bear at their free ends against the cover member when the device is assembled and resiliently bias the center of the spring against the center of the disc. In order to insure that the spring is properly positioned within the body member during assembly of the cover member the spring is provided with an additional three lateral projections or legs which extend substantially radially with respect to the disc and provide axial tabs which are adjacent to the wall of the cavity provided by the body member. In the illustrated embodiment the locating tabs on the spring also function to insure that the snap disc is also properly positioned during assembly and operation of the device.

DETAILED DESCRIPTION OF THE DRAWING

Figure 1:
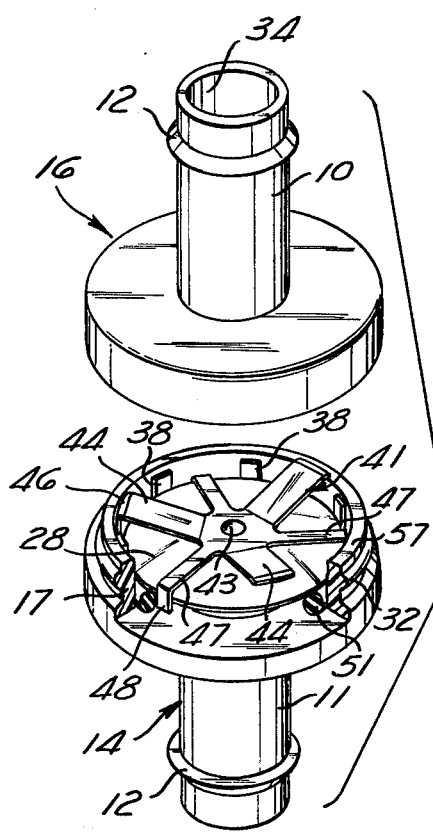
FIG. 1 is an exploded perspective view of a preferred embodiment of the present invention with the body partially cut away to better illustrate the structure.

The illustrated embodiment incorporating the present invention is intended for use in an automotive system in which it is connected in a hose line. Such embodiment therefore, provides two tubular projections 10 and 11 each of which is formed with a rib 12 so that when each projection is inserted into a hose end a good sealing connection is provided.

The basic valve structure includes two molded parts which cooperate to provide a housing assembly 13 consisting of a body member 14 and a cover member 16. The body member is formed with a cylindrical flange 17 which extends from a radially extending wall 18 and cooperates therewith to define a portion of a valve chamber 19. Inwardly of the radial wall 18 the body member 14 is formed with a second axially extending cylindrical wall 21 and a radially extending wall 22 to provide an extension 23 of the valve chamber 19 communicating with a bore or port 24 extending through the tubular projection 11. Integrally formed with the body member 14 is a bridging section 26 which supports a central positioning projection 27 for engagement and location of the central portion of a bimetal snap disc 28.

The cover member 16 is provided with a radially extending wall 29 which extends from the tubular projection 10 to a depending cylindrical flange 31 proportioned to snap over the flange 17 and to lock onto the body member by means of a cooperating locking and sealing structure including a rib 32 on the exterior of the flange 17 and a groove 33 on the flange 31. The two members 14 and 16 are formed of a material providing sufficient resiliency to allow the two members to be pressed together until the rib 32 snaps into the groove 33 to permanently connect the two parts.

The cover member 16 cooperates with the body member to define and enclose the valve chamber 19 which is in communication both with the port 24 of the body member 14 and a port 34 extending through the tubular projection 10 of the cover member 16.

Figure 2:
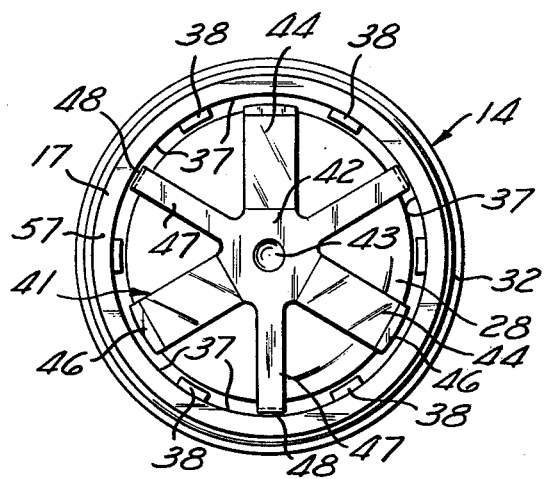
FIG. 2 is a plan view of the valve with the cover removed to illustrate the interior valve structure.

As best illustrated in FIGS. 1 and 2 the inner wall of the flange 17 of the body member is generally cylindrical and consists of a plurality of symmetrically arranged arcuate sections 37 and intermediate rib portions 38. In the illustrated embodiment there are six arcuate sections 37 and six intermediate ribs 38. The inner surfaces of the ribs are segments of a cylinder having a diameter slightly greater than the diameter of the bimetal snap disc 28 so that the bimetal snap disc 28 is laterally positioned within the valve chamber with slight clearance.

A spider type spring 41 having a shape best illustrated in FIGS. 1 and 2 is located in the valve chamber and functions to resiliently press the center portion of the disc 28 toward the positioning projection 27. The spring includes a center portion 42 having a central projection 43 therein and three symmetrically positioned spring arms 44 which project radially from the central section 42 and are inclined upwardly as viewed in the drawings to flatten end portions 46 which engage the inner surface of the radial wall 29 and resiliently urge the projection 43 against the central portion of the bimetal snap disc 28.

The spring 41 is also provided with three symmetrically positioned lateral projections 47 which extend out from the central portion 42 substantially in the plane of the central portion to depending end tabs 48. The end tabs have a radius selected to closely fit within the sectors 37 to insure that the spring 41 is properly positioned within the valve cavity during the assembly of the cover member 16 on the body member 14. The ribs 38 terminate at location spaced from the cover member by a distance at least equal to the thickness of the spring so that the ends of the spring projections 44 cannot interfere with the assembly of the cover and body member or be trapped between such member. Therefore, the tabs 48 are free of any material frictional contact with the body member.

After assembly the tabs are free to position themselves axially so that they do not affect spring operations. This structure insures that the spring and the snap disc is properly centered both during assembly and during use since the tabs 48 extend down around the periphery of the snap disc past the edge thereof.

Figure 3:
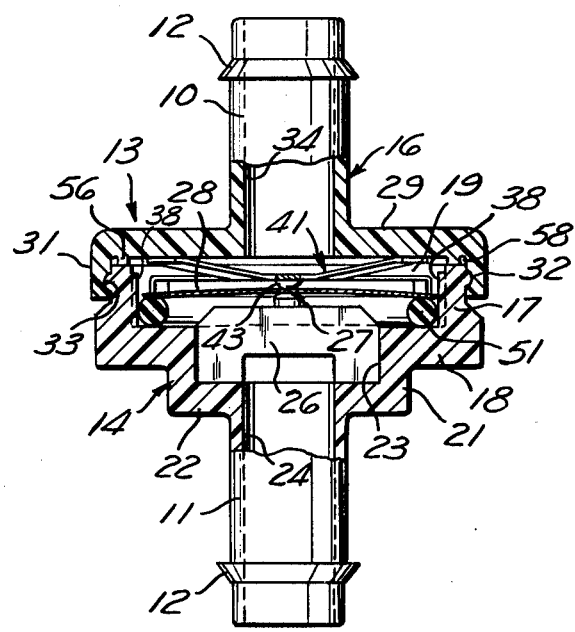
FIG. 3 is a side elevation partially in longitudinal section illustrating the valve in the closed position in which the snap disc engages the O-ring type valve seat.
Figure 4:
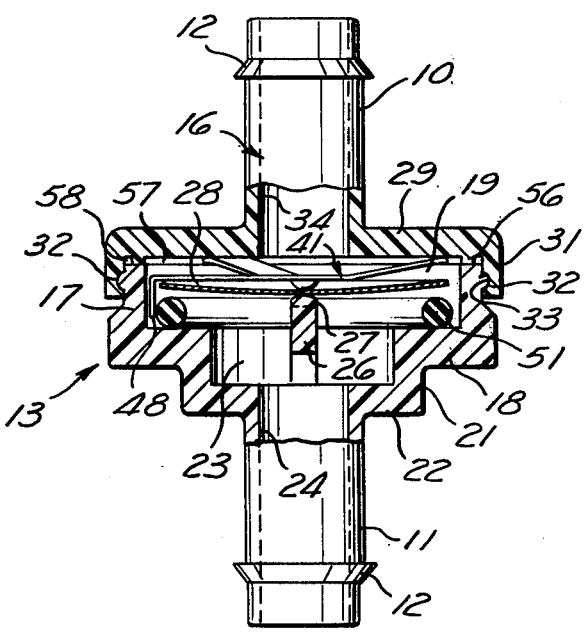
FIG. 4 is a side elevation similar to FIG. 3 with the valve illustrated in the open position and with the plane of the section rotated 90° compared with the plane of the section of FIG. 3 to illustrate the structure of the body member along a different plane.

Positioned in the valve cavity against the inner surface of the radial wall 18 is an O-ring valve seat 51 which is also radially located by the tabs 48 and the ribs 38 and is sized to be engaged by one side of the snap disc adjacent to the periphery thereof when the snap disc is in the position illustrated in FIG. 3. In such position the valve is closed by the engagement of the snap disc with the O-ring 51 and in turn by its engagement with the body member 14. However, when the disc snaps through to the other position of stability as illustrated in FIG. 4 the periphery of the snap disc lifts up away from the O-ring valve seat 51 and the valve is open for through flow.

When the valve is in the closed position the spring 41 presses against the center of the disc and insures engagement of the periphery of the disc with the O-ring seal.

A valve with the structure as illustrated is normally intended for use as a temperature responsive valve which functions in response to temperature to positively prevent flow when the valve is in the closed position. However, when desired, the spring force supplied to the disc by the spring 44 can be selected so that the valve can be used as a temperature responsive check valve to allow free flow in both directions when the valve is open and to allow to flow only from the port 24 through the valve to the port 34 when a predetermined greater pressure exits in the port 24 than the port 34. In such latter case the differential pressure force on the snap disc is sufficient to cause the spring to be compressed and allow movement of the disc away from the valve seat for flow in one direction, but the valve positively prevents flow in the opposite direction. Because the disc is positively supported at its center a greater pressure in the port 34 than in the port 24 does not tend to cause movement of the disc to the valve open position. When the valve is intended for check valve type operation the force of the spring is selected with respect to the area of the snap disc to maintain the valve close until a predetermined pressure differential exists which is sufficient to overcome the action of the spring and allow opening movement of the valve.

The illustrated cover member 16 is formed with an annular rib 56 which seats against the end face 57 of the flange 17 to axially locate the cover member 16 with respect to the body member 14. The rib 56 has a smaller radial width than the end face 57 and is centered so that the rib does not engage any flash at the edges of the end face 57 which might result from the molding of the body member 14. The rib 56 is spaced from the flange 31 by an annular groove 58 which is filled with a sealant such as epoxy when a complete seal is required between the two members 14 and 16.

With the illustrated embodiment of this invention relatively small number of parts are required to produce a valve which operates accurately and reliably. Further, the structure is arranged so that the assembly of the valve is easily accomplished since the danger of improper positioning of the spring and disc during assembly is virtually eliminated.

Although a preferred embodiment of this invention is illustrated it is to be understood that various modifications and rearrangements may be resorted to without departing from the scope of the invention disclosed and claimed.

I claim:

1. A temperature responsive valve comprising a body member having a valve cavity therein providing a lateral wall and an end face, said body being formed with an upstanding generally cylindrical flange providing said lateral wall and end face, a closure member closing said cavity and cooperating with said valve cavity to define a valve chamber, said closure member providing a recess enclosing the end face of said cylindrical flange, a valve seat in said chamber, a bimetal snap disc in said chamber movable into and out of engagement with said valve seat in response to changes in temperature, and a spring positioned against said disc on the side thereof opposite said seat and operable to urge said disc in a direction toward said seat, said spring including locating means engaging said lateral wall and operating to locate said spring during assembly of said closure member and said body member, said locating means preventing said spring from being trapped between said end face of said cylindrical flange and said closure member, said spring being formed of sheet material providing a central portion and a plurality of symmetrically arranged inclined projections which extend from said central portion and engage said closure member at their free ends to urge that central portion into engagement with the said disc substantially at the center thereof, said locating means including a plurality of symmetrically arranged lateral projections extending from said central portion to free ends substantially adjacent to said lateral wall at a location axially spaced from said end face.

2. A temperature responsive valve as set forth in claim 1 wherein said free ends of said lateral projections are provided with depending tabs which extend along said lateral wall and centrally locate said spring within said chamber.

3. A temperature responsive valve as set forth in claim 2 wherein said tabs extend past the edge of snap disc.

4. A temperature responsive valve as set forth in claim 3 wherein said valve seat is an O-ring loosely positioned in said cavity for engagement by said disc adjacent to its periphery, and said tabs extend to a position laterally adjacent to said O-ring.

5. A temperature responsive valve as set forth in claim 2 wherein said tabs are free for movement along said lateral wall.

6. A temperature responsive valve comprising a body member having a valve cavity therein providing a lateral wall and an end face, a closure member closing said cavity and cooperating with said valve cavity to define a valve chamber, a valve seat in said chamber, a bimetal snap disc in said chamber movable into and out of engagement with said valve seat in response to changes in temperature, and a spring positioned against said disc on the side thereof opposite said seat and operable to urge said disc in a direction toward said seat, said spring including locating means engaging said lateral wall and operating to locate said spring during assembly of said closure member and said body member, said spring being formed of sheet material providing a central portion and a plurality of symmetrically arranged inclined projections which extend from said central portion and engage said closure member at their free ends to urge that central portion into engagement with said disc substantially at the center thereof, said locating means including a plurality of symmetrically arranged lateral projections extending from said central portion to free ends substantially adjacent to said lateral wall at a location axially spaced from said end face.

7. A temperature responsive valve as set forth in claim 6 wherein said body member provides a positioning surface engaging and positioning the center of said disc on the side thereof opposite said spring.

8. A temperature responsive valve as set forth in claim 6 wherein said free ends of said lateral projections are provided with depending tabs which extend along said lateral wall.

9. A temperature responsive valve as set forth in claim 8 wherein said lateral wall provides a plurality of arcuate sections with intermediate ribs, and said tabs are located between said ribs adjacent to said arcuate sections.

10. A temperature responsive valve comprising a body assembly including a body member and a closure member formed with generally cylindrical flanges which telescope together and provide lock means maintaining said members assembled together, said body member having an end face at the end of its cylindrical flange, said assembly defining a valve chamber having a lateral wall and ports open to said valve chamber an annular valve seat in said valve chamber, a bimetal snap disc operable in response to predetermined temperatures to move with snap action between two positions of stability, a positioning surface on one of said members engageable with one side of said disc, a spring engaging the other side of said disc and resiliently urging it against said positioning surface, said disc in one of said positions of stability engaging said valve seat to close said valve and upon movement to its other positions of stability being spaced from said valve seat to open said valve, said spring being formed of sheet metal and providing inclined projections extending to free ends engaging the other of said body members, said spring also being formed with lateral projections positioned adjacent to said lateral wall during assembly of said members to position said spring during said assembly.

11. A temperature responsive valve comprising a body member having a valve cavity therein which is substantially symmetrical about an axis, a closure member closing said cavity and cooperating with said valve cavity to define a valve chamber, said body member and closure member providing side walls extending substantially in a direction of said axis and end walls extending substantially perpendicular to said axis, a valve seat in said chamber, a bimetal snap disc in said chamber movable into and out of engagement with said valve seat in response to changes in temperature, and a spring position against said disc on the side thereof opposite said seat operable to urge said disc in a direction towards said seat, said spring including a plurality of substantially planar symmetrically arranged locating projections each providing a lateral extension adjacent its end engaging a side wall and operating to locate said spring during assembly of said closure member and said body member, said spring also including a plurality of symmetrically arranged inclined projections operable to engage an end wall after assembly to react against the force between said spring and said disc.

* * * * *